United States Patent [19]

Zoepfl

[11] 3,893,099

[45] July 1, 1975

[54] ATHLETIC TIMER

[76] Inventor: Jack A. Zoepfl, 3410 S. 292nd, Auburn, Wash. 98002

[22] Filed: July 25, 1973

[21] Appl. No.: 382,578

[52] U.S. Cl.............. 340/323; 340/321; 340/384 E
[51] Int. Cl. ............................................. G08b 3/10
[58] Field of Search................ 340/323, 309.1, 279; 272/4, 5; 35/29 R, 29 B; 58/38, 145 A, 130 E, 152

[56] References Cited
UNITED STATES PATENTS

| | | | |
|---|---|---|---|
| 3,119,610 | 1/1964 | Clinton | 35/29 R |
| 3,492,582 | 1/1970 | Heywood | 35/29 R |
| 3,540,344 | 11/1970 | Veech | 58/130 E |

*Primary Examiner*—Thomas B. Habecker
*Attorney, Agent, or Firm*—Christensen, O'Connor, Garrison & Havelka

[57] ABSTRACT

A miniature audio timing mechanism for use in certain athletic events and training. A conventional audio oscillator circuit and associated speaker is secured in some manner to an athlete's person, and provides an audible tone at controlled time intervals. The length of the time interval may be adjusted by the user in accordance with the requirements of a particular athletic event, the frequency of associated distance markers which are placed at regular intervals along the course of the event, and the performance goal the athlete has established. The timing mechanism thus provides an accurate and real-time indication to the athlete of his performance with respect to a specified time standard.

7 Claims, 3 Drawing Figures

PATENTED JUL 1 1975  3,893,099

ATHLETIC TIMER

BACKGROUND OF THE INVENTION

This invention relates generally to the art of timers for use in athletic events, and more specifically to those athletic timers providing an audio signal at specified intervals of time.

A common problem in many athletic events, particularly in distance events, wherein an individual or team competes against other individuals or teams over a given course, is maintaining a proper "pace" in accordance with training and ability, so that maximum results may be achieved for a given effort. Examples of such athletic events include track, cross country, swimming, crew, and skiing.

Athletes competing in these events necessarily train for extended periods of time so that they may perform to the best of their ability in competition. To be effective, however, training requires a means of performance feedback, and the more immediate the feedback the better. A standard feedback method uses another individual with a timer, who records the athlete's performance and relates it back to him, either at certain intervals during performance or at the conclusion thereof. However, this has proved to be often inaccurate, distracting, and sometimes ineffective, particularly in skiing and swimming. Thus, a reliable, accurate timing means is necessary to provide an athlete instantaneous feedback with respect to his pace over the course of the athletic event. Preferably, such feedback is easily discernable, such as an audio tone, and may be secured to the athlete, without interfering with his performance, so that the normal additional manpower requirement for training is eliminated.

In view of the above, it is a general object of the present invention to provide an athletic timer which overcomes the disadvantages of the prior art.

It is another object of the present invention to provide an athletic timer providing an audible tone at predetermined intervals.

It is a further object of the present invention to provide an athletic timer wherein the time interval between audible tones is adjustable.

It is a further object of the present invention to provide an athletic timer which may be easily carried on the athlete's person and which does not interfere with his performance.

It is still another object of the present invention to provide an athletic timer whereby the athlete, training alone, is provided an accurate real-time account of his performance and pace.

SUMMARY OF THE INVENTION

Accordingly, the present invention includes a means for providing a short duration audible tone at predetermined intervals of time, the tone means being easily securable to the athlete, such that it does not interfere with the athlete's performance. More specifically, the invention may include a plurality of position markers, which are placed at regular intervals along an athletic course. Actual distance traversed by the athlete may then be correlated by the athlete with the successive audio tones, to provide an accurate indication of his continuing performance with respect to a given timed standard.

DESCRIPTION OF THE PREFERRED EMBODIMENT

Figure 1:
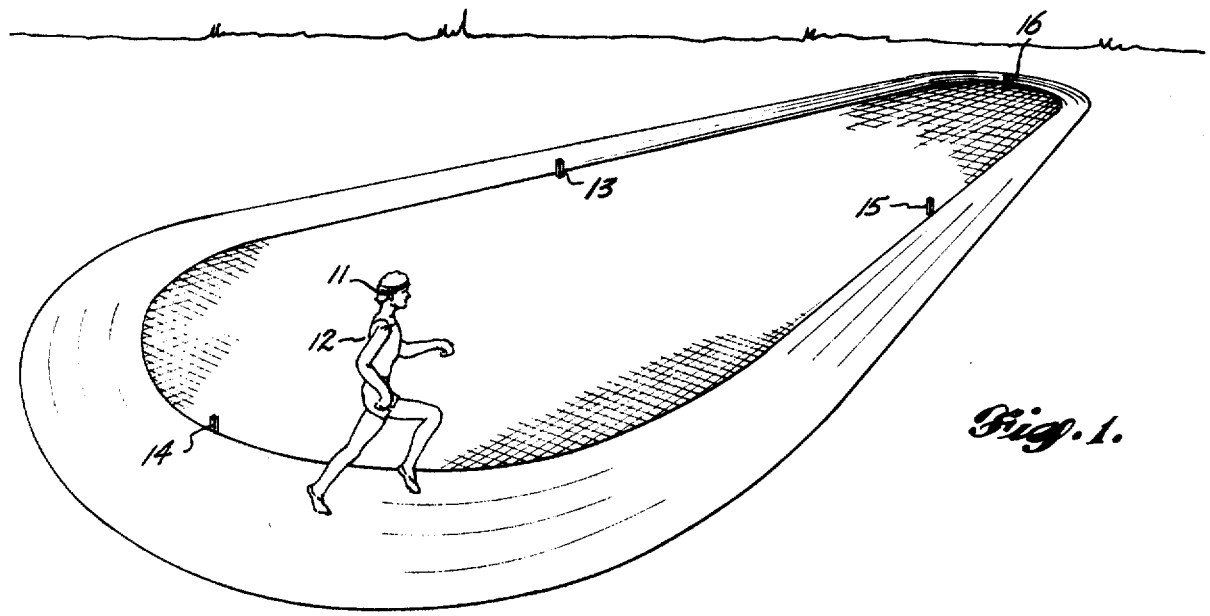
FIG. 1 is a pictorial view of the present invention in actual use.

Referring to FIG. 1, the present invention is shown in use for a track field event and the invention will be generally described in that context. However, it should be understood that the invention is by no means limited to track field events, and indeed is useful in any circumstances wherein athletes are competing against each other or against time over a specified athletic course which may be divided into defined distance increments.

Figure 3:
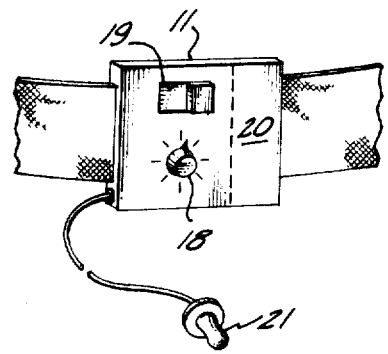
FIG. 3 is a view of the preferred structure of the present invention.

The audio timer of the present invention, shown generally at 11 in FIGS. 1 and 3, is secured in some manner such as by a sweat band to the athlete 12 while he runs the course. Off-on switch 19 connects voltage source 20 to the rest of the circuit, while dial control 18 is used to adjust the tone interval. Although the invention is described in the context of a preferred embodiment wherein the audio tone circuitry is all contained on the athlete, other configurations may use a single stationary transmitter associated with one or more receivers, each receiver being secured to an athlete.

In FIG. 1, the athletic course is shown to be a standard 440-yard oval track, which is the typical course in track field events. Although the audio timer may be secured to the athlete by various means, two typical means would be: 1) a miniature attachment fitted over or around the athlete's ear; and 2) an attachment positioned in a headband such as shown in FIG. 3, which is securely fitted to the head of the athlete in combination with an ear plug speaker 21. Both of these methods provide for the secure attachment of an audio timer to the athlete in such a manner that he may conveniently hear the audio tone without having his performance diminished by the presence of the device. Other such attachment methods accomplishing similar results can, of course, be easily envisioned by a man ordinarily skilled in this art.

A plurality of fixed position markers 13–16 may be positioned around the athletic course, e.g., the 440-yard oval track shown in FIG. 1, to assist the athlete in identification of distance. The markers are typically, although not necessarily, placed at regular intervals around the track. FIG. 1 shows the use of four such markers, a first marker 13 at a starting point, the second 14 at the 110-yard position, the third 15 at the 220-yard position, and the fourth 16 at the 330-yard position. A lesser or greater number of position markers may be placed around the track at given intervals, depending upon the preciseness of the pace desired, and the type of event. For distance training, for instance, it might be desirable to have the markers positioned at greater intervals, while for shorter distances it would be desirable to have a greater number of markers along a given distance so that the athlete might have adequate performance feedback. The markers themselves, of course, may be of any configuration, and they may be fixed in the ground alongside the track or they may be temporarily positioned at predetermined points along the track surface. The configuration of the individual position markers is important to the present invention only insofar as the markers provide various reference points along the athletic course so that the athlete may correlate the output of the audio timer with actual distance achieved along the given course.

A series of short duration tones is provided to the athlete by the timer after it is activated, successive tones being separated by a controlled time interval which is substantial when compared with the duration of the tone. The timer is adjustable by a control dial 18 such that the interval between tones may vary from on the order of 5 seconds to 65 seconds. This provides the timer a substantial operational flexibility so that it may be used in many athletic training applications. For instance, if the athlete wanted to maintain a regular pace of 440 yards in one minute, he would set the timer to provide a tone at 15 second intervals, and then regulate his pace such that he would be adjacent one of the markers shown in FIG. 1 when he heard the audio tone.

Figure 2:
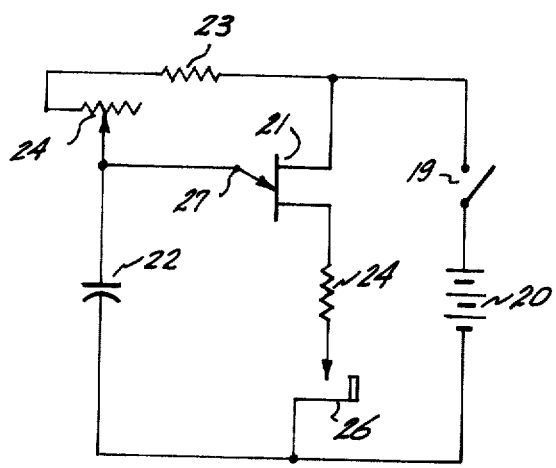
FIG. 2 is a schematic diagram of the circuit of the present invention.

Referring to FIG. 2, a schematic diagram shows the circuit which provides the audio tone to the athlete in the embodiment wherein the entire circuitry is secured to the athlete. The circuit is a conventional RC oscillator utilizing a unijunction transistor 21 for amplification as well as discharge of capacitor 22. Voltage source 20 is typically a miniature 9-volt battery, similar to that used in hearing aids. When the off-on switch 19 is closed, capacitor 22 begins to charge through fixed resistance 23 and variable resistance 24, the ratio of the maximum variable resistance to the fixed resistance typically being on the order of 100:1. The movement of dial 18 varies the value of variable resistance 24. Capacitor 22 will charge toward a peak value equal to the value of the battery 20, its rate of charge depending upon the battery voltage, the total value of resistance in the charge path, and the size of the charging capacitor.

By varying the resistance 24 over its entire range, the interval between the audible tone pulses supplied by the oscillator may be substantially varied. When the charge on the capacitor 22 reaches a given level, transistor 21 fires, providing a low resistance path for discharge of the capacitor 22. Current flow is established through resistor 24, through a speaker connection 26, to a conventional ear plug speaker 21 (FIG. 3) which responds by emitting a short sound burst. When the voltage at point 27 falls below the required firing voltage of transistor 21, it turns off, and capacitor 22 again begins to charge through resistances 23 and 24. This cycle repeats until the switch 19 is returned to the off position. Short audible tone bursts are thus presented to the athlete at time intervals determined by the setting of the variable resistance.

Thus, a means is provided by the present invention for an athlete to accurately monitor, in real-time, his pace over a given athletic course, without human assistance.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A system for providing an indication to a runner of his pace over a given course, comprising in combination:

a plurality of markers positioned at spaced points along the course, successive markers defining therebetween successive portions of the course;

signal means adapted to be secured to the runner without substantially interfering with his pace and operative to provide tone bursts at regular intervals of time, said tone bursts being audible to the runner, each of said tone bursts having a time duration which is substantially shorter than said intervals of time, said intervals of time being sufficiently long that the runner covers substantially one of said portions of the course between markers in one of said intervals of time between successive tone bursts, the runner's position relative to the markers at each successive tone burst providing an indication of his pace over the course.

2. An apparatus of claim 1, wherein said signal means includes timer means, switch means, speaker means and means for energizing said speaker, said switch means being operative in response to said timer means to couple said energizing means to said speaker means for a short period of time relative to said intervals of time.

3. An apparatus of claim 2, wherein said timer means is an RC circuit energized by said battery and said switch means is a unijunction transistor.

4. An apparatus of claim 3, wherein the resistance of said RC circuit is adjustable.

5. An apparatus of claim 1, including an adjustable headband, wherein said signal means is secured to the athlete by said adjustable headband, the signal means being secured to the headband, and further including an earphone depending from the signal means to the vicinity of the ear of the athlete, when the handband in in place.

6. An apparatus of claim 1, including means for varying the intervals of time between the bursts.

7. An apparatus of claim 6, wherein said intervals of time are at least on the order of 5 seconds.

* * * * *